(12) United States Patent
Skuratovsky et al.

(10) Patent No.: US 11,645,717 B2
(45) Date of Patent: May 9, 2023

(54) SYSTEMS AND METHODS FOR COMPUTING SYSTEMATIC RISK FACTOR EXPOSURES OF INVESTMENT FUNDS

(71) Applicant: JPMORGAN CHASE BANK, N.A., New York, NY (US)

(72) Inventors: Ilya Skuratovsky, Riverside, CT (US); Michael Kishelev, South Orange, NJ (US); Joe Staines, New York, NY (US); Andrew R. Poole, Dublin, OH (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 339 days.

(21) Appl. No.: 16/848,937

(22) Filed: Apr. 15, 2020

(65) Prior Publication Data
US 2020/0334760 A1 Oct. 22, 2020

Related U.S. Application Data

(60) Provisional application No. 62/835,367, filed on Apr. 17, 2019.

(51) Int. Cl.
*G06Q 40/00* (2023.01)
*G06Q 40/06* (2012.01)
*G06N 5/022* (2023.01)
*G06F 17/16* (2006.01)

(52) U.S. Cl.
CPC .............. *G06Q 40/06* (2013.01); *G06F 17/16* (2013.01); *G06N 5/022* (2013.01)

(58) Field of Classification Search
CPC ........ G06Q 40/06; G06Q 40/00; G06F 17/16; G06N 5/022

USPC ......................................................... 705/36 R
See application file for complete search history.

(56) References Cited

U.S. PATENT DOCUMENTS

| | | | | |
|---|---|---|---|---|
| 2013/0018818 | A1* | 1/2013 | Yadav ................... | G06Q 40/06 705/36 R |
| 2014/0317019 | A1* | 10/2014 | Papenbrock ........... | G06Q 40/06 705/36 R |
| 2016/0098796 | A1* | 4/2016 | Jeet ........................ | G06Q 40/06 705/36 R |

OTHER PUBLICATIONS

Google Scholar Search, dated Apr. 21, 2022 (Year: 2022).*
Dialog NPL (non-patent literature) Search, dated Apr. 21, 2022. (Year: 2022).*
Notification of Transmittal of the International Search Report and the Written Opinion of the International Searching Authority in PCT/US20/28242 dated Jul. 15, 2020.

* cited by examiner

*Primary Examiner* — Hai Tran
(74) *Attorney, Agent, or Firm* — Greenblum & Bernstein P.L.C.

(57) ABSTRACT

Embodiments disclosed herein provide for systems and methods of calculating the coefficients and creating a linear multivariate model of price returns for a given target portfolio by using the factor characteristic data of the fund's constituents at a particular point in time. The systems and methods provide for creating quantile matrices based on the target portfolio and a plurality of synthetic factor portfolios, and computing weights on each synthetic factor portfolio such that the sum of squared differences between each cell in the profile matrix of the fund and the factor portfolios is minimized.

16 Claims, 5 Drawing Sheets

Fund 200

| Portfolio | | Security Factor Scores | | | |
|---|---|---|---|---|---|
| Security | Weight | Factor 1 Score Percentile | Factor 2 Score Percentile | Factor f3 Score Percentile | |
| Security A | $w_A$ | $P_{f1A}$ | $P_{f2A}$ | $P_{f3A}$ | |
| Security B | $w_B$ | $P_{f1B}$ | $P_{f2B}$ | $P_{f3B}$ | |
| Security C | $w_C$ | $P_{f1C}$ | $P_{f2C}$ | $P_{f3C}$ | |
| ... | | ... | ... | ... | |

Quantile Matrix 220

| d | Percentile $P_n = n \times 100/N$ | Factor 1 Weight | Factor 2 Weight | Factor x Weight |
|---|---|---|---|---|
| d=0 | | $\sum w\,[P_n < P_{f1} \leq P_{n+1}]$ | $\sum w\,[P_{n-1} < P_{f2} \leq P_n]$ | $\sum w\,[P_{n-1} < P_{f3} \leq P_n]$ |
| d=1 | | | | |
| ... | | | | |
| d=D-1 | | | | |

SYSTEMS AND METHODS FOR COMPUTING SYSTEMATIC RISK FACTOR EXPOSURES OF INVESTMENT FUNDS

CROSS-REFERENCE TO RELATED APPLICATION

This application claims the benefit of the filing date of, and incorporates by reference thereto in its entirety, U.S. Provisional Patent Application Ser. No. 62/835,367, filed on Apr. 17, 2019.

FIELD OF THE INVENTION

The present invention relates generally to investment funds, and more particularly to systems and methods for computing the systematic risk factor exposures associated with investment funds.

BACKGROUND

In finance, equity investment funds such as mutual funds and exchange-traded funds consist of baskets of underlying equity securities. Linear factor models are used by investment professionals to model price returns of investment funds. Factors represent sources of risk and serve as the independent variables in the model. For a given investment fund linear factor model, the period return of the fund is modeled as the sum of the products of the fund's factor sensitivity and the return of the factor for the same period. Historically, these sensitivities, or coefficients, of the linear factor model are computed using linear multivariate regression against historical returns of factor portfolios over some time period. This technique requires there be enough data points for results to be statistically significant, making results for funds that have only recently been incepted less useful. Additionally, this technique assumes that the characteristics of the fund that produce a factor coefficient remain stable through time.

Accordingly, there is a need for a method of determining coefficients and constructing a linear multivariate model of price returns for a given investment fund with a short or no history.

SUMMARY

One aspect of the present disclosure relates to providing a system and method for calculating the coefficients and creating a linear multivariate model of price returns for a target portfolio, e.g., investment fund, by using the factor characteristic data of the portfolio's constituents at a particular point in time. According to an embodiment, a target portfolio is a financial instrument for which systematic risk exposures are calculated as expressed by a linear model of the target fund's returns to a set of systematic factor portfolio returns. The target portfolio consists of one or more holdings, where a holding is a tradable security for which factor scores and a weight can be computed relative to other holdings in the fund. For example, target portfolios can be mutual funds, indexes, and exchange-traded funds. A factor can be constructed using quantitative attributes of a tradable security that can be ranked across a universe. Examples of attributes used for ranking are: market capitalization, last fifty days return, price-earnings (P/E) ratio, etc. A factor can also be defined using a combination of attributes.

According to an embodiment, a set of factors are used as inputs to create factor portfolios. A factor portfolio is a grouping of tradable securities and associated weights that represents a systematic risk associated with the factor. Further, a factor portfolio may be associated with a particular security universe. A security universe consists of a set of tradable securities that represents a particular market. For example, universes can be all stocks in a given region (e.g., country, continent, etc.), or all global stocks. As such, universes can be identified as either regional or global.

According to one embodiment, every security has a factor score for each factor in the factor set. Holdings in different universes can be combined to form larger, combined universes. A user may specify the methodology utilized to create factor portfolios. For example, a factor portfolio can be created where securities percentiles associated with a rank of 0 to a selected number N are assigned a weight multiplier of −1, while securities percentiles associated with ranks from 100-N to 100 are assigned a weight multiplier of 1, and securities percentiles associated with ranks from N to 100-N are assigned a weight multiplier of 0.

Further, according to one embodiment, the method includes creating a first quantile matrix based on the target portfolio and creating a second quantile matrix based on combined factor portfolios. A quantile matrix is an N×f matrix where N is the number of quantiles, and f is the number of factors in the linear factor model. Each cell ($N_i$, $f_j$) in the quantile matrix represents the weighted percentage of securities that fall within the $N_i$-th quantile by a factor $f_j$ characteristic rank. Coefficients in the linear factor model are calculated by computing weights on each synthetic factor portfolio $P_f$ such that the sum of squared differences between each cell in the quantile matrix of the fund and each cell in the combined factor portfolios is minimized.

According to one embodiment of the invention, a system for creating a price return model for a target portfolio includes a processor, wherein the processor is configured to: receive the target portfolio; generate a first quantile matrix based on the received target portfolio; combine a plurality of factor portfolios with corresponding weights into a combined factor portfolio; generate a second quantile matrix based on the combined factor portfolio; determine a sum of squared differences between the first and second quantile matrices; generate optimized weights for each of the factor portfolios such that the sum of the squared differences between the first and second quantile matrices is minimized; and create the price return model based on the optimized weights.

Further, a method for creating a price return model for a target portfolio can include: receiving, with a processor, the target portfolio; generating, with the processor, a first quantile matrix based on the received target portfolio; combining, with the processor, a plurality of factor portfolios with corresponding weights into a combined factor portfolio; generating, with the processor, a second quantile matrix based on the combined factor portfolio; determining, with the processor, a sum of squared differences between the first and second quantile matrices; generating, with the processor, optimized weights for each of the factor portfolios such that the sum of the squared differences between the first and second quantile matrices is minimized; and creating, with the processor, the price return model based on the optimized weights.

One advantage that can be provided by embodiments of the invention is the ability to provide a return model, which is predictive of the relationships between a portfolio's return and those of factor portfolio, based only on data from a single point in time (as opposed to requiring data over an extended time period). In particular, an advantage is provided over conventional regression methods that: 1) require enough data points to make results statistically significant and 2) suffer from the changing factor exposures of an investment fund over time. Specifically, with conventional regression methods, a time series of returns is required in order to calculate factor exposures for a fund. The amount of data points in the time series ideally needs to be sufficient for results to be statistically significant—e.g., 3 years of monthly data points for a total of 36. In that case, the fund needs to have existed for at least 3 years in order to calculate the factor exposures. In addition, if a fund's exposures change over time, the resulting single exposure numbers will represent a mixture of exposures. On the other hand, with the present invention, factor exposures can be efficiently and accurately calculated for funds with a short or no history.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

DETAILED DESCRIPTION

Exemplary embodiments of the invention will now be described in order to illustrate various features of the invention. The embodiments described herein are not intended to be limiting as to the scope of the invention, but rather are intended to provide examples of the components, use, and operation of the invention.

Figure 1:
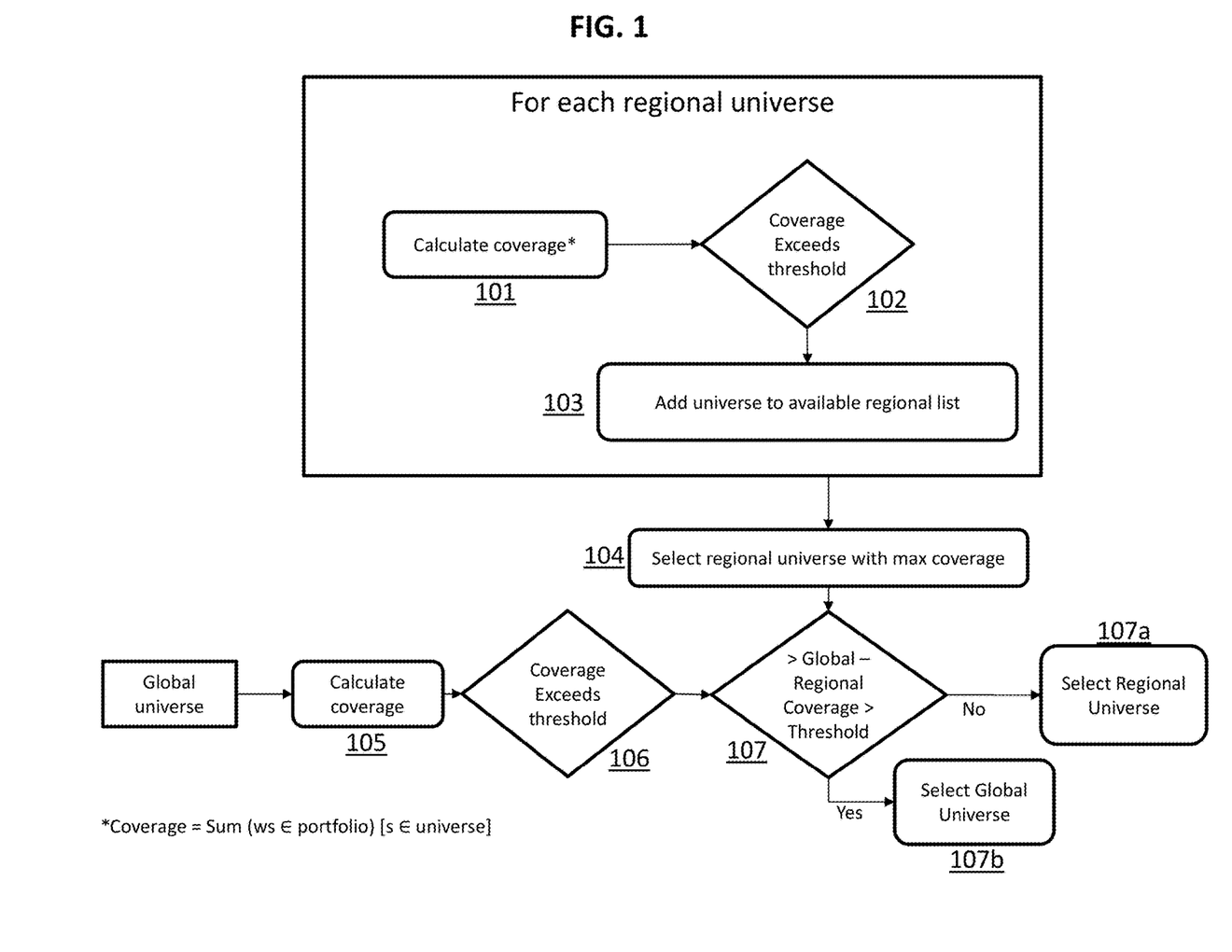
FIG. 1 illustrates an example of a method for universe selection according to an embodiment of the invention.

FIG. 1 illustrates an example of a method for universe selection according to an embodiment of the invention. In order to determine the systematic factor exposures associated with certain factor portfolios, the appropriate security universe for the factor portfolios is first determined. As described above, a universe can be identified as either regional or global, and can also be defined by other characteristics such as market capitalization or industry sector, for example. Investors typically want to analyze factor risk models in terms of the investment fund's region, e.g. for an investment fund that only invests in the U.S. stocks, the factor model expected by investors would only show exposures to systemic risk factors in the U.S. Further, the systematic risk for distinct regions (e.g., U.S. and Europe) is generally different (i.e., exhibits different statistical properties). The regional systematic risk universe may be determined by identifying what percentage of a fund's holdings belong to that regional universe. If that percentage results in the fund having a better fit for that universe than other universes subject to a general threshold, that universe is selected. If no regional universes meet the criteria, the global universe is selected.

According to one embodiment of the invention, in order to choose the appropriate universe for a factor portfolio, it is necessary to calculate the coverage. "Coverage" generally refers to the percentage of securities in a portfolio that fall within a particular universe. According to one embodiment, coverage is calculated as the sum of the weighted securities in a fund, wherein the securities correspond to a particular universe, i.e., sum (ws∈portfolio) [s∈universe]. The weight of the security corresponds to the currency value (e.g., in U.S. dollars) the fund holds in relation to all other securities. For example, if a fund holds only $100 in IBM stock and $300 in AAPL stock, the weight of the IBM stock in the fund is 25% and the weight of the AAPL stock is 75%. Further, as regards to coverage, if 80% of the securities in a particular fund are U.S. securities, then the regional (i.e., United States) coverage for that fund is 80%. With regard to global coverage, if a global universe consists of all securities globally having over $100 million in market capitalization then if 95% of the securities in a particular fund are securities of this kind, then the global coverage for that fund is 95%.

According to one embodiment, the regional and global universe coverages may be determined as illustrated in FIG. 1. In step 101, a regional coverage is calculated for each target portfolio (e.g., fund) in the regional universe. The coverage may be calculated as the sum of the weighted securities in a fund, wherein the securities correspond to a particular universe, using the equation above, i.e., sum (ws∈portfolio) [s∈universe].

After the coverage for the fund in the regional universe is determined, it may then be compared to a regional coverage threshold as depicted in step 102. The regional coverage threshold may be predefined by a user. For example, in order for the factor exposure model to be based on at least 50% of the fund's holdings, a threshold of 50% may be chosen. As such, only those funds having a significant amount of covered holdings will be included, thereby ensuring that the risk model is reasonably accurate. According to one embodiment, if the coverage for the fund exceeds the regional coverage threshold in step 102, then the regional universe is added to an available regional list in step 103. Thus, the coverage for a fund may exceed the threshold for more than one regional universe. In step 104, the regional universe with the highest coverage is determined so that it can be compared with the global universe coverage for that fund.

In step 105, the global universe coverage is calculated for the fund. According to an embodiment, the global universe coverage is calculated the same way as the regional universe coverage (i.e., sum (ws∈portfolio) [s∈universe]). In other words, the global universe coverage is the sum of the weights of the holdings that are found in the global universe. Then, in step 106, it is determined if the global universe coverage exceeds a global coverage threshold. Similar to the regional coverage threshold, the global coverage threshold may be predefined. According to one embodiment, if the calculated global universe coverage exceeds the global coverage threshold, then the method may proceed to step 107. At step 107, it is determined if the difference between the calculated global universe coverage and the calculated regional universe coverage exceeds an override threshold (e.g., 10%). If so, then the global universe coverage is selected as depicted in step 107b. Otherwise, the regional universe coverage is selected as depicted in step 107a.

Figure 2A:
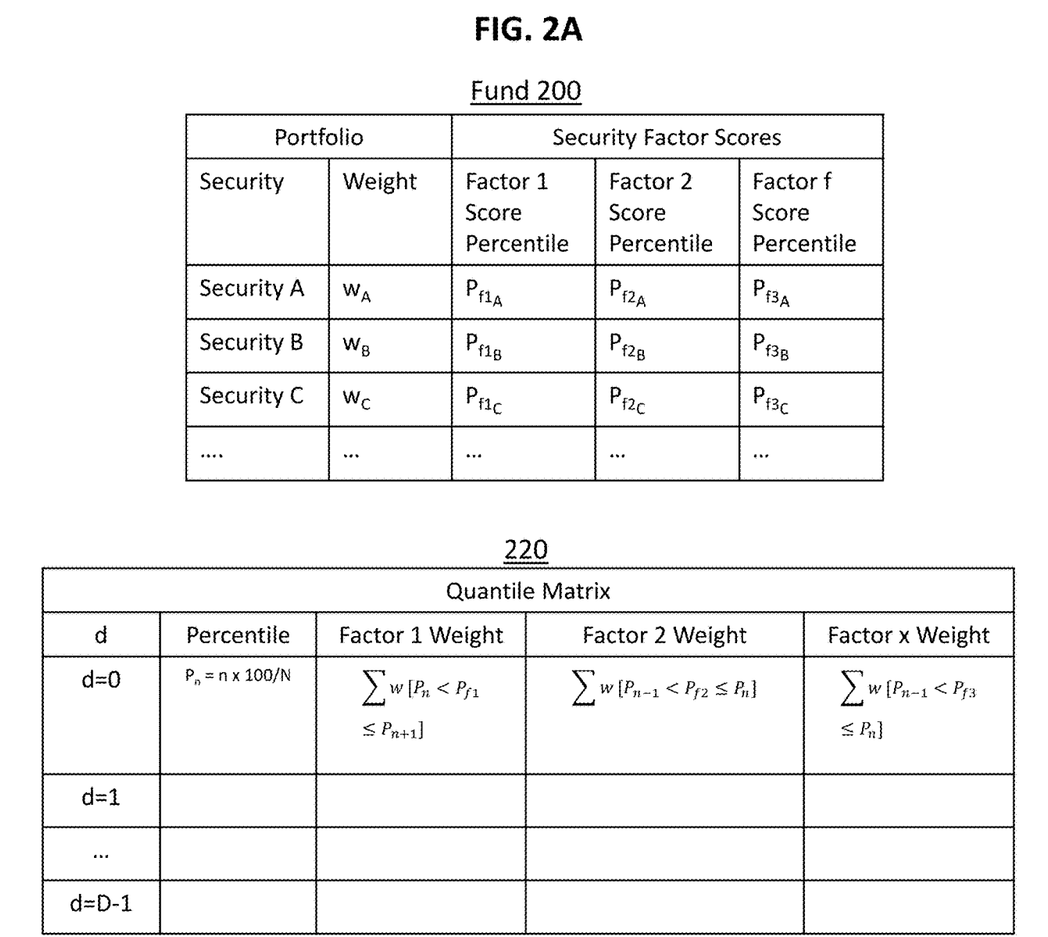
FIG. 2A illustrates an example of a quantile matrix construction method according to an embodiment of the invention.

FIG. 2A illustrates an example of quantile matrix construction from a number of factor portfolios according to an exemplary embodiment of the invention. As shown in FIG. 2A, a target portfolio 200 may be comprised of a plurality of securities, where each security is associated with a corresponding weight and percentile rank for each of the factors X. According to an embodiment, factor characteristic data for a particular point in time can be collected from sources such as the most recent financial reports prior to the point in time by the issuing company of a security, market data up to the point in time describing the price or volumes traded in the security, or derived quantities, such as ratios of the above. A quantile matrix 220 can be generated from a number of factor portfolios by (1) selecting a number D for the number of quantiles and (2) summing the weights of the securities in the target portfolio 200 into each cell of the matrix 220 where the security's percentile rank for the factor column falls within the bounds of the quantile row. In particular, the quantile matrix entries are defined as the sum of weights for securities whose factor percentile ranks fall within the defined range, where percentile rank is the percentile rank within the particular universe (e.g., regional or global). For example, the percentile can be defined as P_f1A=100*n_f1A/N, where n_f1A is the number of securities in the universe whose factor characteristic exceeds that of security A (plus half of number of securities in the universe whose factor characteristic equals that of security A, where such is required) and N is the total number of securities in the universe. According to an embodiment, the percentile rank is not defined for securities not contained in the universe, so a re-normalization of the quantile matrix terms may be required if the coverage is less than 100%. According to an embodiment, the number D may be selected by the user. The selected number D should be a balance between having too few quantiles (less information conveyed by the quantile matrix) and too many (too granular and will result in a model that finds spurious relationships). Further, as depicted in the quantile matrix 220, the number of quantiles determines the percentage range for each of the quantiles. For example, if there were ten quantiles, then there would ten percentage ranges, i.e., 0 to 10%, 11% to 20%, 21% to 30%, . . . 91% to 100%.

Figure 2B:
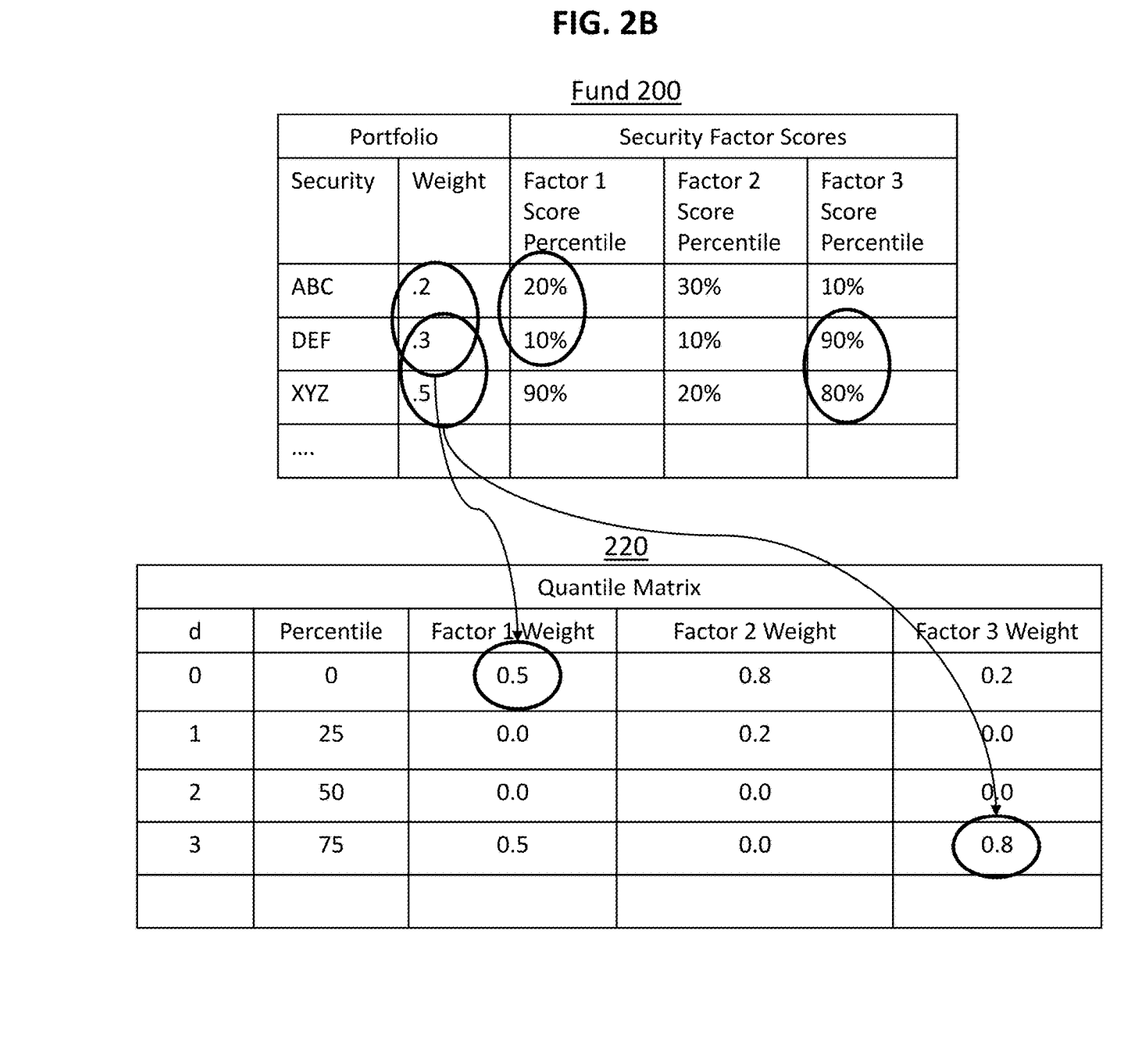
FIG. 2B illustrates an example of the quantile matrix in FIG. 2A.

FIG. 2B illustrates an example of the quantile matrix in FIG. 2A. As depicted in FIG. 2B, the Factor 1 Weight for d=0 is equal to the sum of the weights (0.2+0.3=0.5) for securities ABC and DEF in the first quantile (where the Factor 1 Score Percentiles are 20% and 10%, both of which are less than 25%). The Factor 3 Weight for d=3 is equivalent to the sum of the weights (0.3+0.5=0.8) for securities DEF and XYZ in the fourth quantile (where the Factor 3 Score Percentiles are 90% and 80%, both of which are greater than 75%). The other entries in the quantile matrix 220 are calculated in the same way.

Figure 3:
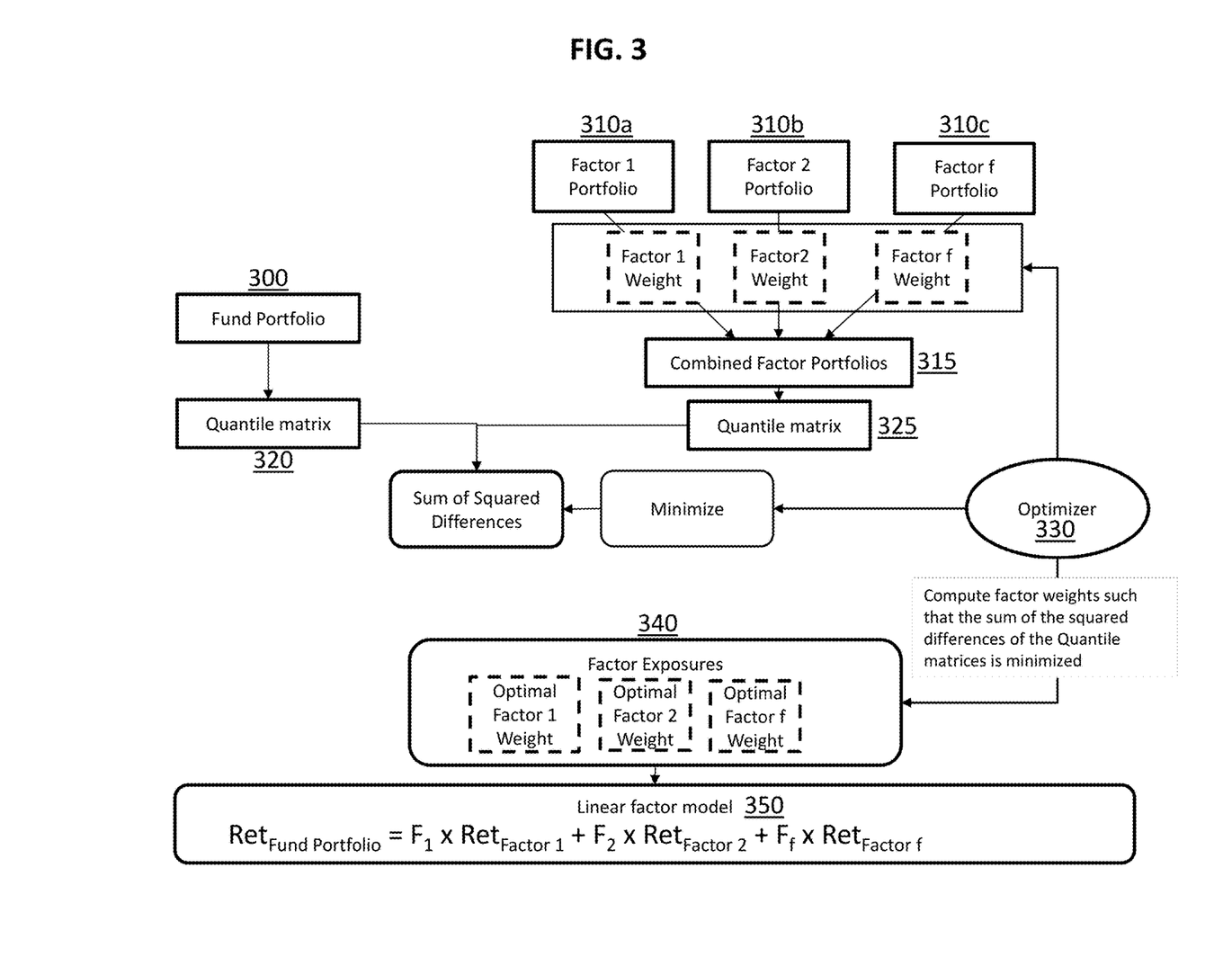
FIG. 3 illustrates an example of a method for factor exposure calculation according to an embodiment of the invention.

FIG. 3 illustrates an example of a process for factor exposure calculation according to an embodiment of the invention. As depicted in FIG. 3, a first quantile matrix 320 is generated based on the target portfolio 300. According to an embodiment, the first quantile matrix 320 is generated using the method illustrated in FIGS. 2A and 2B. Then, a second quantile matrix 325 is generated based on factor portfolios 310a, 310b, and 310c. According to an embodiment, each of the factor portfolios 310a, 310b, and 310c is associated with an initial weight (e.g., 0), and then the holdings of each factor portfolio are combined into a combined factor portfolio 315. Further, the holdings in the combined factor portfolio 315 may be computed as the weighted sum of each security in each factor portfolio times the weight of that factor portfolio in the combined portfolio 315.

The combined factor portfolio 315 is then utilized to generate the second quantile matrix 325. According to an embodiment, the second quantile matrix 325 is generated utilizing the same method to generate the first quantile matrix 320. Then, after both of the quantile matrices 320 and 325 are generated, the sum of the squared differences between each cell in the quantile matrices 320 and 325 can be determined. The optimizer 330 then computes optimal factor weights 340 such that the sum of the squared differences of the quantile matrices 320 and 325 is minimized. According to an embodiment, the optimizer 330 may utilize the Levenberg-Marquardt algorithm to determine the weights 340. The optimal factor weights 340 may then be used to construct a linear factor model 350 of fund returns in terms of the return on factor portfolios, e.g., $\text{Ref}_{Fund} = F_1 \times \text{Ret}_{Factor1} + F_2 \times \text{Ret}_{Factor2}$, where $\text{Ret}_{Fund}$ is the risk premium (e.g., the expected return of the fund), $F_1$ and $F_2$ are the optimized weights, and $\text{Ret}_{Factor1}$ and $\text{Ret}_{Factor2}$ are the expected returns/risk premiums of the respective factor portfolio. For example, an investment fund investing in only U.S. securities can be compared to factor portfolios comprising a market capitalization weighted portfolio containing all U.S. equity securities and an earnings weighted portfolio containing all U.S. equity securities. The optimal factor weights are those minimizing the sum squared difference in their quantile matrix and describe a return model which defines the weights contributed to the investment fund returns by capitalization-weighted and earnings-weighted factors. According to an embodiment, the linear factor model 350 can be used to attribute historical return premiums and risk to systematic factors and idiosyncratic risk. Further, the linear factor model 350 can be used in future scenario analyses, where the return of a fund can be calculated based on the returns of factor portfolios. Further, the linear factor model 350 can also be used in risk/return optimization. For example, based on given co-variances between factor portfolios, factor models of different funds can be combined to calculate risk/return profiles of a portfolio of funds. Further, according to an embodiment, if the intension of a fund is to provide exposure to the value factor, and the method revealed a low weight in the value factor, a user can be prompted to sell securities held in the fund with poor value percentile rank and purchase replacements with better value percentile rank.

Figure 4:
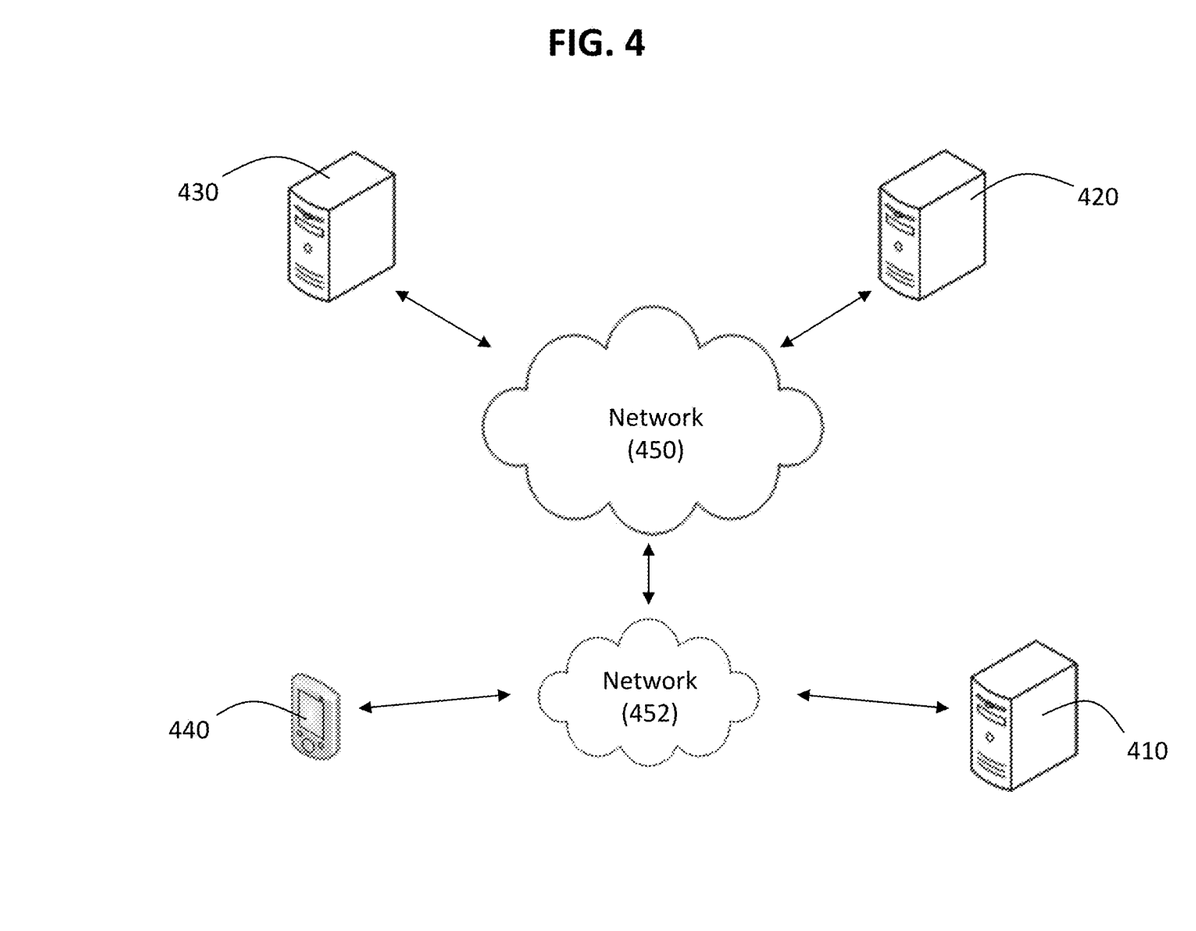
FIG. 4 illustrates an example of a system for computing the systematic risk factor exposures associated with investment funds according to an exemplary embodiment of the invention.

FIG. 4 is a diagram of a system for computing the systematic risk factor exposures associated with investment funds according to an exemplary embodiment of the invention. The system of FIG. 4 may be used, for example, to implement the exemplary methods illustrated in FIGS. 1-3. As shown in FIG. 4, the system may include one or more computing devices, such as servers 410, 420, 430, and personal computing device 440. The system may also include one or more networks 450, 452 that connect the various computing devices shown in FIG. 4. Although only one personal computing device 440 and three servers 410, 420, 430 are shown in FIG. 4 to illustrate principles of the invention, in practice additional devices and servers may be involved in implementation of various embodiments of the invention. The networks may comprise, for example, any one or more of the Internet, an intranet, a Local Area Network (LAN), a Wide Area Network (WAN), an Ethernet connection, a WiFi network, a Global System for Mobile Communication (GSM) link, a cellular phone network, a Global Positioning System (GPS) link, a satellite communications network, or other network, for example.

The system for computing the systematic risk factor exposures associated with investment funds may be embodied primarily in a server 410, which executes the methods described above for calculating factor portfolios, quantile matrices, optimal factor weights, and the linear factor model. The system may also include, or interface with, servers 420 and 430 that store and provide data that is input to the server 410. The system may be accessed and controlled by a personal computing device 440 which may comprise a mobile phone, tablet computer, laptop computer, or desktop computer, for example.

Although the foregoing examples show the various embodiments of the invention in one physical configuration, it is to be appreciated that the various components may be located at distant portions of a distributed network, such as a local area network, a wide area network, a telecommunications network, an intranet and/or the Internet, for example. Thus, it should be appreciated that the components of the various embodiments may be combined into one or more devices, collocated on a particular node of a distributed network, or distributed at various locations in a network, for example. The components of the various embodiments may be arranged at any location or locations within a distributed network without affecting the operation of the respective system.

Data and information maintained by the servers described above may be stored and cataloged in one or more databases, which may comprise or interface with a searchable database and/or a cloud database. Other databases, such as a query format database, a Standard Query Language (SQL) format database, a storage area network (SAN), or another similar data storage device, query format, platform or resource may be used. The databases may comprise a single database or a collection of databases. In some embodiments, the databases may comprise a file management system, program or application for storing and maintaining data and information used or generated by the various features and functions of the systems and methods described herein.

As described above, the system may include a number of servers and personal computing devices, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks and method steps described above. Such a set of instructions for performing a particular task may be characterized as a program, software program, software application, app, or software. The modules described above may comprise software, firmware, hardware, or a combination of the foregoing.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The servers and personal computing devices described above may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software instructs the processor what to do with the data being processed.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A system for creating a price return model for a target portfolio, the system comprising:
   a processor, wherein the processor is configured to:
   receive the target portfolio;
   generate a first quantile matrix based on the received target portfolio;
   combine a plurality of factor portfolios with corresponding weights into a combined factor portfolio;
   generate a second quantile matrix based on the combined factor portfolio, wherein each of the first and second quantile matrices correspond to an N×f matrix, wherein N corresponds to a number of quantiles and f corresponds to a number of factors in the price return model;
   determine a sum of squared differences between the first and second quantile matrices;
   use a Levenberg-Marquardt algorithm to generate optimized weights for each of the factor portfolios such that the sum of the squared differences between the first and second quantile matrices is minimized; and
   create the price return model based on the optimized weights, wherein the price return model is generated based on factor characteristic data corresponding to a certain point in time.

2. The system according to claim 1, wherein the processor is further configured to:
   determine a first regional coverage for the target portfolio, wherein the first regional coverage corresponds to a first region;
   compare the first regional coverage to a first regional coverage threshold;
   upon determining that the first regional coverage exceeds the first regional coverage threshold, add the first region to a list including a plurality of regions; and
   determine which region of the plurality of regions is associated with a highest regional coverage for the target portfolio.

3. The system according to claim 2, wherein the first regional coverage corresponds to a sum of a plurality of weighted securities in the target portfolio associated with the first region.

4. The system according to claim 2, wherein the processor is further configured to:
determine a second regional coverage for the target portfolio, wherein the second regional coverage corresponds to a second region, wherein the second region includes the first region;
compare the second regional coverage to a second regional coverage threshold;
upon determining that the second regional coverage exceeds the second regional coverage threshold, determine a difference between the second regional coverage and the highest regional coverage; and
upon determining that the difference exceeds an override threshold, select the second regional coverage for the target portfolio.

5. The system according to claim 4, wherein the processor is further configured to:
upon determining that the difference does not exceed the override threshold, select the highest regional coverage for the target portfolio.

6. The system according to claim 4, wherein the second regional coverage corresponds to a sum of a plurality of weighted securities in the target portfolio associated with the second region.

7. The system according to claim 1, wherein the target portfolio comprises a plurality of securities, wherein each security is associated with a corresponding weight and percentile rank for one or more factors.

8. The system according to claim 1, wherein the factor characteristic data is collected from at least one from among: one or more financial reports that are most recent but prior to the certain point in time, and market data describing at least one from among one or more prices of a first security prior to the certain point in time and one or more volumes traded in the first security prior to the certain point in time.

9. A method for creating a price return model for a target portfolio, the method comprising:
receiving, with a processor, the target portfolio;
generating, with the processor, a first quantile matrix based on the received target portfolio;
combining, with the processor, a plurality of factor portfolios with corresponding weights into a combined factor portfolio;
generating, with the processor, a second quantile matrix based on the combined factor portfolio, wherein each of the first and second quantile matrices correspond to an N×f matrix, wherein N corresponds to a number of quantiles and f corresponds to a number of factors in the price return model;
determining, with the processor, a sum of squared differences between the first and second quantile matrices;
using a Levenberg-Marquardt algorithm to generate, with the processor, optimized weights for each of the factor portfolios such that the sum of the squared differences between the first and second quantile matrices is minimized; and
creating, with the processor, the price return model based on the optimized weights, wherein the price return model is generated based on factor characteristic data corresponding to a certain point in time.

10. The method according to claim 9, further comprising:
determining, with the processor, a first regional coverage for the target portfolio, wherein the first regional coverage corresponds to a first region;
comparing, with the processor, the first regional coverage to a first regional coverage threshold;
upon determining that the first regional coverage exceeds the first regional coverage threshold, adding, with the processor, the first region to a list including a plurality of regions; and
determining, with the processor, which region of the plurality of regions is associated with a highest regional coverage for the target portfolio.

11. The method according to claim 10, wherein the first regional coverage corresponds to a sum of a plurality of weighted securities in the target portfolio associated with the first region.

12. The method according to claim 10, further comprising:
determining, with the processor, a second regional coverage for the target portfolio, wherein the second regional coverage corresponds to a second region, wherein the second region includes the first region;
comparing, with the processor, the second regional coverage to a second regional coverage threshold;
upon determining that the second regional coverage exceeds the second regional coverage threshold, determining, with the processor, a difference between the second regional coverage and the highest regional coverage; and
upon determining that the difference exceeds an override threshold, selecting, with the processor, the second regional coverage for the target portfolio.

13. The method according to claim 12, further comprising:
upon determining that the difference does not exceed the override threshold, selecting, with the processor, the highest regional coverage for the target portfolio.

14. The method according to claim 12, wherein the second regional coverage corresponds to a sum of a plurality of weighted securities in the target portfolio associated with the second region.

15. The method according to claim 9, wherein the target portfolio comprises a plurality of securities, wherein each security is associated with a corresponding weight and percentile rank for one or more factors.

16. The method according to claim 9, wherein the factor characteristic data is collected from at least one from among: one or more financial reports that are most recent but prior to the certain point in time, and market data describing at least one from among one or more prices of a first security prior to the certain point in time and one or more volumes traded in the first security prior to the certain point in time.

\* \* \* \* \*